United States Patent
Aviv et al.

(10) Patent No.: US 9,278,890 B2
(45) Date of Patent: Mar. 8, 2016

(54) CONTINUOUS PROCESS FOR MANUFACTURING FREELY FLOWING SOLID ACIDIC P/K FERTILIZER

(71) Applicant: ROTEM AMFERT NEGEV LTD., M.P. Arava (IL)

(72) Inventors: Talia Aviv, D.N. Hanegev (IL); Uri Sasson Cohen, Metar (IL); Doron Orgil, Arad (IL); Itsik Aroch, Beer Sheva (IL)

(73) Assignee: Rotem Amfert Negev Ltd., M.P. Arava (IL)

( * ) Notice: Subject to any disclaimer, the term of this patent is extended or adjusted under 35 U.S.C. 154(b) by 0 days.

(21) Appl. No.: 14/407,212

(22) PCT Filed: Jun. 27, 2013

(86) PCT No.: PCT/IL2013/050552
§ 371 (c)(1),
(2) Date: Dec. 11, 2014

(87) PCT Pub. No.: WO2014/002098
PCT Pub. Date: Jan. 3, 2014

(65) Prior Publication Data
US 2015/0158778 A1    Jun. 11, 2015

(30) Foreign Application Priority Data

Jun. 28, 2012   (IL) .......................................... 220686

(51) Int. Cl.
| | | |
|---|---|---|
| *C05B 7/00* | (2006.01) |
| *C05B 17/00* | (2006.01) |
| *C05B 13/06* | (2006.01) |
| *C05D 1/00* | (2006.01) |
| *C05D 5/00* | (2006.01) |
| *C01B 25/30* | (2006.01) |
| *C01B 25/34* | (2006.01) |
| *C05G 3/00* | (2006.01) |

(52) U.S. Cl.
CPC .............. *C05B 17/00* (2013.01); *C01B 25/301* (2013.01); *C01B 25/34* (2013.01); *C05B 7/00* (2013.01); *C05B 13/06* (2013.01); *C05D 1/00* (2013.01); *C05D 5/00* (2013.01); *C05G 3/0088* (2013.01)

(58) Field of Classification Search
CPC ....................................................... C05B 7/00
See application file for complete search history.

(56) References Cited

U.S. PATENT DOCUMENTS

| | | | | |
|---|---|---|---|---|
| 3,533,776 A | * | 10/1970 | Coates et al. ..................... | 71/28 |
| 3,907,538 A | * | 9/1975 | Hauschild ......................... | 71/34 |
| 5,374,294 A | * | 12/1994 | Moore .............................. | 71/41 |
| 5,849,060 A | * | 12/1998 | Diping et al. ................. | 71/64.07 |
| 6,080,221 A | * | 6/2000 | Moore .............................. | 71/11 |
| 6,365,120 B1 | * | 4/2002 | Granquist et al. ............. | 423/268 |
| 2009/0081103 A1 | * | 3/2009 | Iannicelli et al. ............. | 423/313 |
| 2010/0186471 A1 | * | 7/2010 | Vriesema et al. ................ | 71/28 |

FOREIGN PATENT DOCUMENTS

| | | |
|---|---|---|
| EP | 1585711 B1 | 10/2005 |
| WO | 0076941 A1 | 12/2000 |
| WO | 0174740 A2 | 10/2001 |
| WO | 2007102159 A2 | 9/2007 |
| WO | 2009072106 A2 | 6/2009 |

* cited by examiner

*Primary Examiner* — Wayne Langel
(74) *Attorney, Agent, or Firm* — Roach Brown McCarthy & Gruber P.C.; Kevin D. McCarthy

(57) ABSTRACT

The invention provides a continuous process for manufacturing a phosphorus/potassium fertilizer from basic chemical commodities. The fertilizer is a free-flowing solid, stable on storage, consisting mainly of a phosphate of formula $KH_5(PO_4)_2$.

12 Claims, No Drawings

CONTINUOUS PROCESS FOR MANUFACTURING FREELY FLOWING SOLID ACIDIC P/K FERTILIZER

FIELD OF THE INVENTION

The present invention relates to a method of manufacturing an acidic particulate phosphorus- and potassium-rich fertilizer, which is easy to store and handle, from basic chemical commodities.

BACKGROUND OF THE INVENTION

Global population growth necessitates ever-growing agricultural production and keeps the demand for fertilizers high. Two main nutrients, phosphorus and potassium (P/K), can advantageously be provided as potassium phosphates. Numerous agricultural applications require acidic fertilizers, which yield concentrated aqueous solutions without forming precipitates in stock solutions, and which do not leave harmful or useless deposits in the soil, while enhancing the absorption of the nutrients in plants. WO 2007/102159 provides a potassium phosphate-based particulate composition which easily dissolves in water to yield clear acidic solution, the composition being manufactured from phosphoric acid and monopotassium phosphate. Ideally, fertilizers should be available from cost-effective processes, and should have suitable consistency for easy handling. The art still does not provide enough fertilizers with the required characteristics, suitable for all situations, and a need is felt for new large-scale processes for making such fertilizers. It is an object of the present invention to provide a continuous process for manufacturing an easy-to-handle granular acidic P/K fertilizer.

It is also an object of the invention to provide a continuous process for manufacturing an acidic P/K solid fertilizer from commodity chemicals.

It is another object of the invention to provide a solid fertilizer supplying phosphorus and potassium essentially in equiatomic amounts.

It is still another object of the invention to provide a solid fertilizer supplying phosphorus and potassium, the fertilizer being free-flowing and with a low tendency to cake.

It is a still further object of this invention to provide a continuous method for manufacturing a solid, easy-to-handle P/K acidic fertilizer from phosphoric acid and potassium hydroxide.

Other objects and advantages of present invention will appear as description proceeds.

SUMMARY OF THE INVENTION

The present invention provides a continuous process for manufacturing a solid, free-flowing acidic phosphorus/potassium (P/K) fertilizer, comprising steps of i) providing agriculturally acceptable phosphoric acid (PA) and partially neutralizing it with a neutralizer selected from monopotassium phosphate (MKP) and potassium hydroxide (KOH), thereby providing an aqueous mixture which provides a pH of less than 3.0 when diluted ten times with water; ii) drying said aqueous mixture of step i) in a vacuum dryer at a temperature between 70 and 120° C. and a pressure of at most 500 mbar whereby obtaining a solid material comprising less than 5 wt % water; iii) cooling down said solid material of step ii) to ambient temperature; and iv) mixing said cooled solid material with a solid magnesium source in an amount of from 0.1 to 3 wt %, based on said cooled solid material; thereby obtaining the free flowing solid fertilizer without tendency to cake, comprising an acidic phosphate of formula $KH_5(PO_4)_2$ and water in an amount of 5 wt % or less. Said step of drying comprises contacting a liquid stream comprising a phosphate of formula $KH_5(PO_4)_2$ with a solid surface comprising the same phosphate. Said step of drying preferably comprises continually combining a liquid stream comprising a phosphate of formula $KH_5(PO_4)_2$ with a partially dried solid comprising the same phosphate. The process may comprise dripping said liquid stream onto said partially dried solid. The continuous process according to the invention preferably comprises the step of preparing a concentrated solution of PA, and a liquid phase comprising a neutralizer selected from MKP and KOH. Said PA and said neutralizer react in a reactor preferably kept at a temperature of from 70 to 120° C. Said step of drying is preferably performed in a drying unit kept at a temperature of from 70 to 120° C., at a pressure of at most 500 mbar. Said step of reacting said PA with said neutralizer is preferably separated in time and space from said step of drying. Said step of neutralizing may, in one aspect of the invention, comprise reacting MKP with PA in a weight ratio of from 1.32 to 1.85. In one embodiment, said weight ratio between MKP and PA is from 1.43 to 1.85. In other aspect of the invention, said step of neutralizing comprises reacting KOH with PA in a weight ratio of from 0.28 to 0.33. In one embodiment, the weight ratio of KOH and PA is from 0.29 to 0.33. Said step of drying preferably achieves the water content of 1 wt % or less. In a preferred embodiment, said amount of water is between 0.1 and 0.6 wt %. Said magnesium source in the process according to the invention is selected from magnesium oxide, magnesium hydroxide, and magnesium carbonate.

In a preferred embodiment of the invention, the process is performed in an apparatus integrating a reactor in which the neutralization reaction occurs and a vacuum dryer in which water is removed, wherein the products of the reaction between said PA and said neutralizer continuously move through said apparatus, thereby continually converting the reactants into freely flowing solid acidic potassium phosphate. Said apparatus preferably comprises reactor unit, dryer unit, cooling unit, transporting means for moving said products between the units, and controlling means for checking the product composition and humidity and for regulating the velocity of product movement. The reactants, PA and the neutralizer, are continuously fed to the apparatus, and the mixture continuously moves through it.

The invention is directed to a particulate, freely-flowing acidic P/K fertilizer prepared from PA, and MKP or KOH, the fertilizer comprising particles coated with magnesium phosphate. Said particulate, freely-flowing fertilizer comprises acidic potassium phosphate of the formula $KH_5(PO_4)_2$ and contains at most 5 wt % water. The particulate, freely-flowing fertilizer according to the invention exhibits a low tendency to caking and is stable during storage. In a preferred embodiment of the invention, the particulate, freely-flowing fertilizer consists of at least 85 wt % of potassium phosphate of the formula $KH_5(PO_4)_2$, water in an amount of less than 5 wt %, and magnesium in an amount of at most 2 wt %.

DETAILED DESCRIPTION OF THE INVENTION

The invention relates to a continuous process of manufacturing a solid, free flowing fertilizer essentially consisting of acidic potassium phosphate of the formula $KH_5(PO_4)_2$. The continuous process includes stages of i) reacting in aqueous liquid phase phosphoric acid (PA) with monopotassium phosphate (MKP) or with potassium hydroxide (KOH); ii) drying the aqueous mixture of step i under vacuum, whereby obtaining a solid; iii) cooling the solid of step ii; and iv) admixing cooled solid of step iii with a solid magnesium source. The reaction of step i) is carried out in a stirred reactor with heated jacket. The reagents are heated to a temperature between 70 to 120° C. The reaction product is fed to the vacuum dryer heated to a temperature between 70 to 120° C. After drying, the solid product is cooled down to ambient temperature and mixed with about 3 wt % or less, based on said cooled solid product, of solid magnesium source. Said magnesium source may be selected, for example, from magnesium oxide, magnesium hydroxide, and magnesium carbonate.

It has now been found that solid acidic potassium phosphate exhibiting superior handling qualities can be obtained in any scale by a continuous process comprising a partial neutralization of PA with MKP or with KOH and drying under vacuum, followed by a step of mixing with a solid magnesium source. The freely flowing solid, essentially comprising material of the formula $KH_5(PO_4)_2$, has a low tendency for caking, and can be advantageously employed directly as a fertilizer or in preparing concentrated solutions of various nutrients.

Generally, the process of the invention includes a step of partially neutralizing PA. In a first aspect of the invention, PA is mixed with MKP in an amount of from 1.32 to 1.85 weight parts of MKP per one weight part of PA. In one embodiment of the invention, the amount is from 1.43 to 1.85 weight parts of MKP per one weight part of PA. In a second aspect of the invention, PA is mixed with KOH in an amount of from 0.28 to 0.33 weight parts of KOH per one weight part of PA. In one embodiment of the invention, the amount is from 0.29 to 0.33 weight parts of KOH per one weight part of PA. In one embodiment, the continuous process according to the invention includes the step of preparing aqueous mixture of white phosphoric acid, and KOH in an approximately semimolar amount. In another embodiment, continuous process according to the invention includes the step of preparing aqueous mixture of white phosphoric acid, and MKP in an approximately equimolar amount. In still other embodiment, the continuous process according to the invention includes the step of preparing aqueous mixture of white phosphoric acid with KOH in a slight excess over semimolar amount. In another embodiment, continuous process according to the invention includes the step of preparing aqueous mixture of white phosphoric acid with MKP in a slight excess over equimolar amount.

The continuous process of the invention comprises a step of mixing two powders, a powder of acidic potassium phosphate and an alkaline magnesium source, such as magnesium hydroxide or magnesium oxide.

Thus, a continuous process for manufacturing a non-caking particulate acidic P/K fertilizer from commodity chemicals has now been provided, comprising, in one embodiment, simple steps of i) providing concentrated aqueous solution of phosphoric acid (PA), and aqueous neutralizer (Neut) selected from potassium hydroxide (KOH) and monopotassium phosphate (MKP), ii) reacting said two aqueous components at a PA/Neut weight ratio providing acidic potassium phosphate, essentially of the formula $KH_5(PO_4)_2$, in a liquid phase, iii) drying the liquid phase by contacting it under vacuum conditions with solid surface comprising acidic phosphate whereby obtaining a granular solid, iv) cooling the powder and mixing with a solid magnesium source, whereby obtaining the final freely-flowing fertilizer, wherein said steps occur gradually at adjacent locations separated in time and space, enabling a continuous transformation of liquid PA and neutralizer to the superior granular P/K fertilizer.

The invention relates to a cost-effective continuous process of manufacturing a solid, free flowing, preferably white, fertilizer consisting of acidic potassium phosphate. In one embodiment, the acidic phosphate is present essentially as a compound of the formula $KH_5(PO_4)_2$. On another embodiment, the acidic phosphate is present essentially as a homogeneous mixture of $KH_5(PO_4)_2$ with a small amount of excessive PA. The raw materials are continually incorporated to liquid phase. The reactants, PA, KOH, or eventually MKP, thus include common commodity chemicals, which may be provided at any purity levels, as far as agriculturally unacceptable materials are excluded. In a preferred arrangement of the process, two aqueous raw materials form two reactant streams flowing into a reactor provided with temperature and pressure control. The reactor is capable to keep the reaction mixture preferably at a temperatures of between 70° C. to 120° C. The liquid product of the reaction continues to a vacuum dryer capable to keep the materials preferably at a temperature of 70° C. to 120° C. and at a pressure of 500 mbar or less. The liquid from the reactor is led to the dryer, possibly pumped or injected onto the dryer surface covered by a layer of solid acidic potassium phosphate. The feeding velocity is controlled in accordance with the capability of the vacuum drier to continually remove the vapor. Said reactants, when entering the process, comprise water in amounts not interfering with the required reaction velocity. Powder or granules comprising $KH_5(PO_4)_2$ is initially located in the vacuum drier, before starting the continuous regimen. In a preferred embodiment, a layer of dry $KH_5(PO_4)_2$ covers the walls of the dryer, for example of the screw conveyer. The material is usually scraped off the dryer walls, leaving a part of the solid for contacting the fresh solution. Solid, partially dried material, thus, slowly moves along the vacuum dryer unit and is discharged to the cooler. Dried phosphate is mixed with a magnesium source, such as magnesium oxide; surprisingly, this step improves still more the non-caking character of the fertilizer, which can be stored for prolonged time and then can be easily handled. Said magnesium source is admixed after said drying step. In a preferred embodiment, said magnesium source is admixed after said cooling step. It is believed by the inventors that mixing of the acidic particulate phosphate with a basic magnesium salt or oxide leads to a neutralization reaction on the surface of phosphate particles, thus providing a layer of magnesium phosphate and stabilizing the particle.

The invention provides a continuous process for converting commodity chemicals, PA and KOH, or PA and MKP, to a granular free-flowing P/K fertilizer concentrate providing acidic pH, for example a pH of less than 3 when diluted to a 1% aqueous solution.

The flow ability of a fertilizer product is determined by measuring the time taken by 300 g fertilizer to flow through a truncated cone made of stainless steel, the apex being cut to provide a hole of 1 cm in diameter. The time, t taken by 300 g product, after opening the hole, is compared with the time taken by 300 g of well flowing standard MPK (or other free flowing fertilizer), $t_s$, and the relative fluidity in %, f, is calculated according to the formula:

$$f=100*t_s/t$$

The relative fluidity of the fertilizer according to the invention is preferably at least 50%, such as at least 60% or at least 70%, for example at least 80% or at least 85%.

The invention relates to a continuous method for providing solid, P/K-rich, soluble, acidic, freely-flowing granular, non-caking fertilizer, easy to handle and ready for mixing with additional nutrients. The fertilizer of the invention consists essentially of potassium phosphate of formula $KH_5(PO_4)_2$; it means that the fertilizer contains mainly the acidic phosphate of that formula, for example between 85 wt % and 95 wt % potassium phosphate of said formula, preferably at least 90 wt %, the remainder comprising PA, water, and magnesium. Other agriculturally acceptable components may be present. In one embodiment, the particulate fertilizer consists of at least 90 wt % of potassium phosphate of the formula $KH_5(PO_4)_2$, water in an amount of less than 1 wt %, and magnesium in an amount of less than 3 wt %.

The invention provides a superior particulate P/K fertilizer and a continual method for its preparation, the fertilizer supplying phosphorus and potassium essentially in equiatomic amounts.

The invention will be further described and illustrated in the following examples.

EXAMPLES

Example 1

The continuous process was performed in an apparatus having three sections: reactor, vacuum dryer, and cooler. At the reactor, a feeding mixture was prepared by mixing 291 g MKP and 264.2 g PA (79.4% $H_3PO_4$). The reaction was exothermic and increased the solution temperature to 65-80° C.; the temperature was maintained by heating jacket. The mixture was fed to the vacuum dryer by heated scroll feeder with a velocity of 8 g/min. The vacuum dryer operated at a temperature between 85 to 105° C., and vacuum between 500 to 250 mbar. At the beginning, dry $KH_5(PO_4)_2$ was placed in the vacuum dryer to cover its wall surface. The product flowed to a cooler unit with chilled jacket, which cooled the material down to 45° C., while rotating the product. At the end of the process, MgO was dispersed through the product.

Example 2

The continuous process occurred in an apparatus having three sections:

reactor, vacuum dryer, and cooler. A feeding mixture was prepared in the reactor by mixing 529 g PA (79.4% $H_3PO_4$) and 240 g KOH (50% KOH). The reaction was exothermic accompanied by increasing solution temperature to 65-80° C.; the temperature was maintained by heating jacket. The mixture was fed to the vacuum dryer by peristaltic pump, 6 g/min through heated line. The vacuum dryer operated between 85 to 105° C. and vacuum between 500 to 250 mbar. At the beginning, dry $KH_5(PO_4)_2$ was placed in the vacuum dryer to cover its wall surface. The product flowed to the cooler unit provided with chilled jacket, which cooled the material down to 45° C., while rotating it. At the end of the process, MgO powder was admixed to the product.

While this invention has been described in terms of some specific examples, many modifications and variations are possible. It is therefore understood that within the scope of the appended claims, the invention may be realized otherwise than as specifically described.

The invention claimed is:

1. A continuous process for manufacturing a solid, free-flowing acidic phosphorus/potassium (P/K) fertilizer, comprising steps of
   i) providing agriculturally acceptable phosphoric acid (PA) in an aqueous solution and partially neutralizing it with an aqueous neutralizer selected from the group consisting of monopotassium phosphate (MKP) and potassium hydroxide (KOH) in a reactor kept at a temperature of from 70 to 120° C., wherein said MKP and said KOH are in an amount of from 1.32 to 1.85 and from 0.28 to 0.33, respectively, weight parts per one weight part of PA, to obtain thereby providing an aqueous mixture;
   ii) drying said aqueous mixture of step i) in a vacuum dryer ensuring a reaction temperature between 70 and 120° C. and a pressure of at most 500 mbar to obtain a solid material comprising less than 5 wt % water;
   iii) cooling down said solid material of step ii) to ambient temperature; and
   iv) mixing said cooled solid material with a solid magnesium source selected from the group consisting of magnesium oxide, magnesium hydroxide, and magnesium carbonate in an amount of from 0.1 to 3 wt %, based on said cooled solid material so as to obtain
   the free flowing solid fertilizer without tendency to cake, comprising an acidic phosphate of formula $KH_5(PO_4)_2$ in an amount of between 85 wt % and 95 wt % and water in an amount of 5 wt % or less.

2. The process according to claim 1, wherein said step of drying comprises contacting a liquid stream comprising a phosphate of formula $KH_5(PO_4)_2$ with a solid surface comprising the same phosphate.

3. The process according to claim 2, wherein said step of drying comprises continually combining a liquid stream comprising a phosphate of formula $KH_5(PO_4)_2$ with a partially dried solid comprising the same phosphate.

4. The process according to claim 3, comprising dripping said liquid stream onto said partially dried solid.

5. The continuous process according to claim 1, further comprising the step of preparing a concentrated solution of PA, and a liquid phase comprising a neutralizer selected from the group consisting of MKP and KOH.

6. The process according to claim 5, wherein said step of reacting said PA with said neutralizer is separated in time and space from said step of drying.

7. The process according to claim 1, wherein said amount of water is 1 wt % or less.

8. The process according to claim 1, wherein said amount of water is between 0.1 and 0.6 wt %.

9. The process according to claim 1, wherein said reactor and said vacuum dryer are integrated in an apparatus through which the products of the reaction between said PA and said neutralizer continuously move, thereby continually converting the reactants into freely flowing solid acidic potassium phosphate.

10. The process according to claim 9, wherein said apparatus comprises reactor unit, dryer unit, cooling unit, transporting means for moving said products between the units, and controlling means for checking the product composition and humidity and for regulating the velocity of product movement.

11. A particulate, freely-flowing acidic P/K fertilizer comprising an acidic phosphate of formula $KH_5(PO_4)_2$ in an amount of between 85 wt % and 95 wt %, a solid magnesium source selected from the group consisting of magnesium oxide, magnesium hydroxide, and magnesium carbonate in an amount of from 0.1 to 3 wt %, and water in an amount of at most 5 wt %.

12. The particulate, freely-flowing fertilizer according to claim 11, exhibiting a low tendency to caking and being stable during storage.

* * * * *